(12) United States Patent
Ring et al.

(10) Patent No.: US 9,051,849 B2
(45) Date of Patent: Jun. 9, 2015

(54) ANTI-ROTATION STATOR SEGMENTS

(75) Inventors: Mark David Ring, Cape Neddick, ME (US); Jonathan J. Earl, Wells, ME (US)

(73) Assignee: United Technologies Corporation, Hartford, CT (US)

( * ) Notice: Subject to any disclaimer, the term of this patent is extended or adjusted under 35 U.S.C. 154(b) by 670 days.

(21) Appl. No.: 13/371,525

(22) Filed: Feb. 13, 2012

(65) Prior Publication Data

US 2013/0209248 A1    Aug. 15, 2013

(51) Int. Cl.
*F01D 25/28* (2006.01)
*F01D 25/24* (2006.01)

(52) U.S. Cl.
CPC .................................. *F01D 25/246* (2013.01)

(58) Field of Classification Search
CPC ........... F01D 9/04; F01D 9/041; F01D 9/042; F01D 9/044; F01D 25/246; F05D 2240/10; F05D 2240/12; F05D 2240/14; F05D 2260/30
USPC .................. 29/889.21, 889.22; 415/189–190, 415/209.2–209.4, 210.1
See application file for complete search history.

(56) References Cited

U.S. PATENT DOCUMENTS

| | | | | |
|---|---|---|---|---|
| 3,365,173 | A | * | 1/1968 | Lynch et al. .................. 415/209.3 |
| 4,632,634 | A | | 12/1986 | Vinciguerra et al. |
| 4,687,413 | A | * | 8/1987 | Prario ............................ 415/190 |
| 5,018,941 | A | * | 5/1991 | Heurtel et al. ............. 416/220 R |
| 5,584,654 | A | | 12/1996 | Schaefer et al. |
| 5,762,472 | A | * | 6/1998 | Pizzi et al. ..................... 415/135 |
| 5,846,050 | A | | 12/1998 | Schilling |
| 6,296,443 | B1 | | 10/2001 | Newman et al. |
| 6,537,022 | B1 | | 3/2003 | Housley et al. |
| 6,699,011 | B2 | | 3/2004 | Cot et al. |
| 6,726,446 | B2 | | 4/2004 | Arilla et al. |
| 7,144,218 | B2 | | 12/2006 | Dube et al. |
| 7,819,622 | B2 | | 10/2010 | Paulino et al. |
| 8,684,683 | B2 | * | 4/2014 | Brunt et al. .................... 415/189 |
| 2003/0094862 | A1 | | 5/2003 | Torrance et al. |

(Continued)

FOREIGN PATENT DOCUMENTS

EP    1312767 B1    10/2002
JP    02828651 B2    9/1998

OTHER PUBLICATIONS

International Search Report and Written Opinion for related International Application No. PCT/US2013/025594; report dated May 27, 2013.

*Primary Examiner* — Nathaniel Wiehe
*Assistant Examiner* — Eldon Brockman
(74) *Attorney, Agent, or Firm* — Miller, Matthias & Hull LLP

(57) ABSTRACT

A stator assembly for a turbofan gas turbine engine is disclosed. The stator assembly is coupled to a shroud of the engine. The stator assembly includes an endless case fixedly coupled to the engine shroud. The case includes a forward portion, an aft portion and a central portion disposed therebetween. The case extends about an axis of the engine. The forward and aft portions of the case include rails that extend towards each other and form forward and aft pockets with the central portion respectfully. The stator assembly also includes a locking stator segment. The locking stator segment includes a shroud that includes a forward hook and a pair of aft hooks with a platform disposed therebetween. The forward and aft hooks are retained in the forward and aft pockets of the case respectfully.

15 Claims, 4 Drawing Sheets

(56) References Cited

U.S. PATENT DOCUMENTS

| | | |
|---|---|---|
| 2006/0153683 A1 | 7/2006 | Dube et al. |
| 2007/0237631 A1 | 10/2007 | Lytle |
| 2011/0243722 A1 | 10/2011 | Murphy et al. |
| 2013/0078086 A1* | 3/2013 | Breugnot et al. .......... 415/182.1 |

* cited by examiner

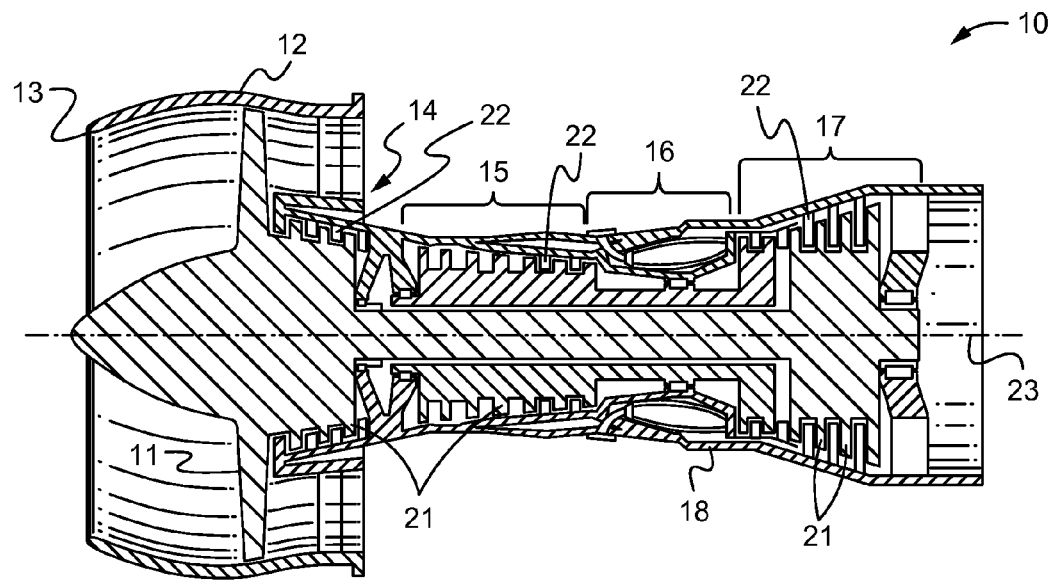
Fig. 1
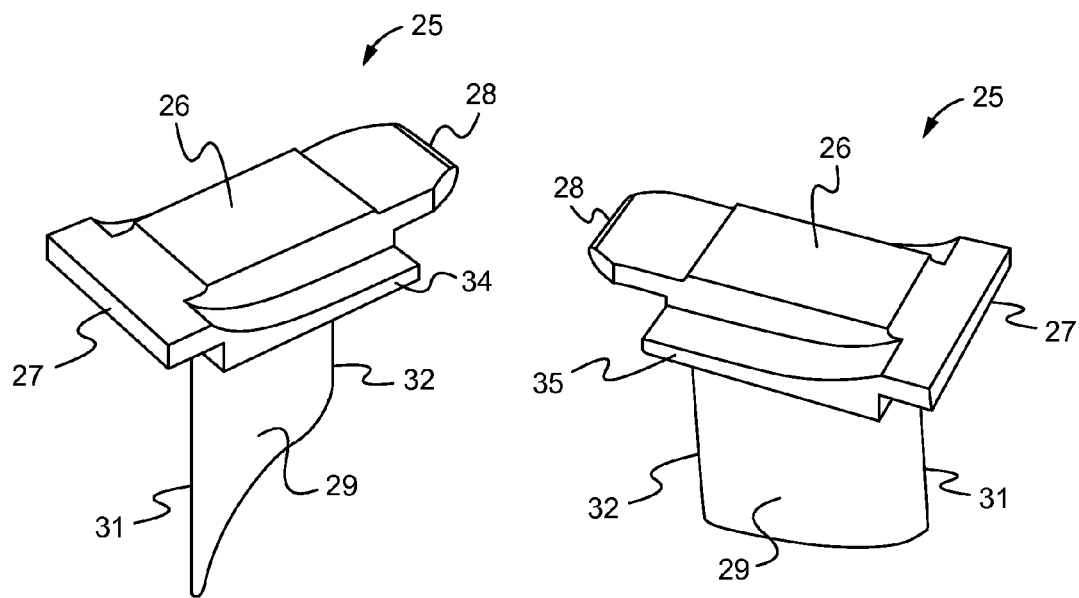
Fig. 3
(Prior Art)
Fig. 4
(Prior Art)

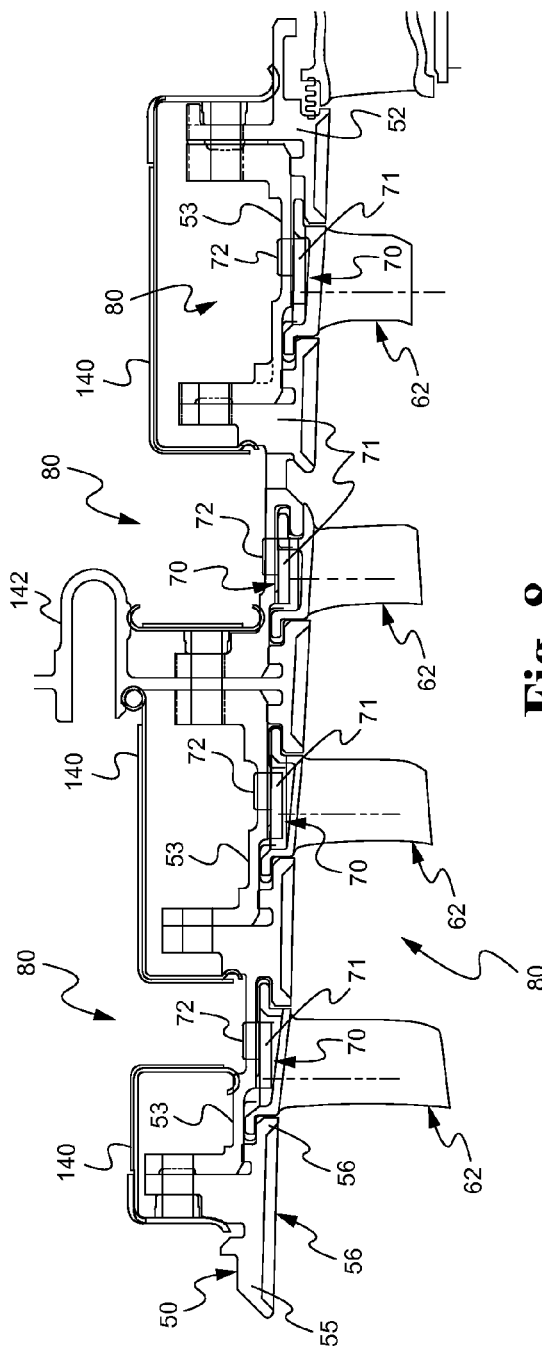
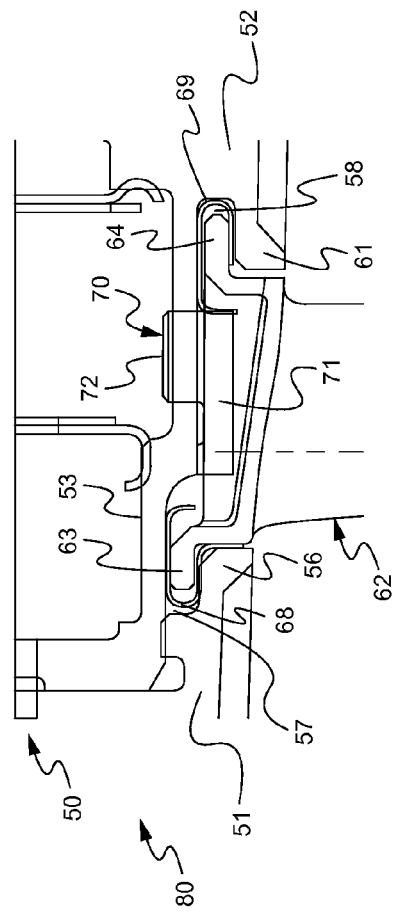

ANTI-ROTATION STATOR SEGMENTS

TECHNICAL FIELD

A gas turbine engine is disclosed with a stator that is prevented from circumferentially rotating about the axis of the engine and/or along the case that holds the stator in place.

BACKGROUND

A gas turbine engine includes one or more forward compressor sections for increasing the pressure of an incoming air stream. For example, a turbofan jet engine includes a low pressure compressor (LPC) disposed between fan at the inlet of the engine and a high pressure compressor (HPC). Each compressor includes alternating axial stages of rotors and stators. Each stator is disposed within a circumferential case. Each rotor may include an outer ring of rotating blades; each stator may include a ring of stator segments, with each segment including a shroud connected to an individual vane or a shroud connected to a plurality of vanes. Each shroud may include forward and aft hooks for coupling the segment to the case. More specifically, each shroud may include forward and aft hooks that are received in forward and aft circumferential slots of the case. During assembly, each segment is inserted into the case by inserting the forward and aft hooks of each segment into the corresponding forward and aft circumferential slots of the case. The case may be split into forward and aft portions or the case may be a unitary ring structure.

During normal operation of a gas turbine engine, the combination of temperature variations between the case and the stator segments and the tolerances built into each separate part (i.e., the stator segments and the case) necessitate a suitable cold-clearance gap between adjacent stator segments. Further, aerodynamic loading of each stator segment generates a tangential force approaching 20 lb·f (90 N) per airfoil included in the segment. In order to uniformly distribute the cold-clearance gaps and prevent circumferential sliding of the segments along the case due to aerodynamic and other forces, anti-rotation lugs, bolts or pins may be employed for each segment or one or more anti-rotation lugs may be circumferentially spaced around the case to prevent rotation of the segments along the case. The lugs may be fastened to the case so that the lug is disposed between two segments and contacts a shroud on each of the two segments. The anti-rotation lugs may also facilitate assembly and the positioning of each segment in the case.

One problem associated with this design is that the anti-rotation lug must engage two segments and a portion of the shrouds of each of the two segments must be removed to form a slot or recess for accommodating the lug. Removing part of the shroud, or more specifically, the platform portion of the shroud disposed between the forward and aft hooks, results in removal of part of the one of the forward or aft hooks (more commonly the aft hook). Removing part of the aft hook renders the pair of stator segments less stable within the case which reduces the ability to control the circumferential position of the locking stator segments.

SUMMARY OF THE DISCLOSURE

In an embodiment, a stator assembly of a gas turbine engine is disclosed. The stator assembly prevents circumferential movement of the stator segments or individual stator segments. Specifically, the stator assembly includes an endless case fixedly coupled to the engine shroud. The case includes a forward portion, an aft portion and a central portion disposed therebetween. The case extends around an axis of the engine. The forward and aft portions of the case extend towards each other beneath the central portion and form forward and aft pockets with the central portion. The stator assembly also includes at least one locking stator segment. The locking stator segment includes a shroud with a forward hook and a pair of aft hooks. The forward and aft hooks are retained in the forward and aft pockets respectively. The shroud of the stator locking vane includes a slot that extends between the pair of aft hooks. The slot or slot accommodates a lug. The lug is coupled to the case.

A gas turbine engine is also disclosed that includes a stator assembly coupled to an engine shroud for preventing circumferential movement of the stator assembly. The stator assembly includes a case that includes a forward portion, an aft portion and a central portion disposed therebetween. The case extends around an axis of the engine and is coupled to the engine shroud. The forward portion of the case includes a rearwardly directed rail; the aft portion of the case includes forwardly directed rail. The rearwardly directed rail of the forward portion and the forwardly directed rail of the aft portion extend towards each other beneath the central portion of the case and form forward and aft pockets respectively. The forward and aft pockets accommodate forward and aft liners respectively. The engine also includes a locking stator segment. The locking stator segment includes a shroud with a forward hook and a pair of aft hooks. The forward and aft hooks are retained in the forward and aft liners respectively. The shroud of the locking stator segment includes a slot. The slot accommodates a lug. The lug is coupled to the case.

A method is disclosed for preventing a circumferential movement of stator segments of a stator assembly of a gas turbine engine. The method includes providing the stator assembly with an endless case and fixedly coupling the endless case to a shroud of the engine. The case includes a forward portion, an aft portion and a central portion disposed therebetween. The case extends around an axis of the engine. The method further includes providing the forward portion of the case with a rearwardly extending rail and providing the aft portion of the case with a forwardly extending case rail. The rails extend beneath the central portion and form forward and aft pockets. The method also includes providing a locking stator segment. The locking stator segment includes a shroud with forward hook and a pair of aft hooks. The forward and aft hooks are retained in the forward and aft pockets of the case respectively. The method also includes providing the shroud of the locking stator segment with a slot. The method further includes inserting a lug in the slot and coupling the lug to the case.

BRIEF DESCRIPTION OF THE DRAWINGS

FIG. 1 is a schematic longitudinal sectional view of an exemplary turbofan gas turbine engine that may be equipped with the anti-rotation stator segments disclosed herein.

FIG. 3 is a perspective view of a conventional locking stator segment.

FIG. 4 is another perspective view of the locking stator segment shown in FIG. 3.

FIG. 8 is a partial sectional view of a turbofan gas turbine engine, particularly illustrating a plurality of stators held in place by locking stator segments and lugs.

FIG. 9 is an enlarged partial view of a locking stator segment, lug and case as illustrated in FIG. 8.

DETAILED DESCRIPTION

Figure 2:
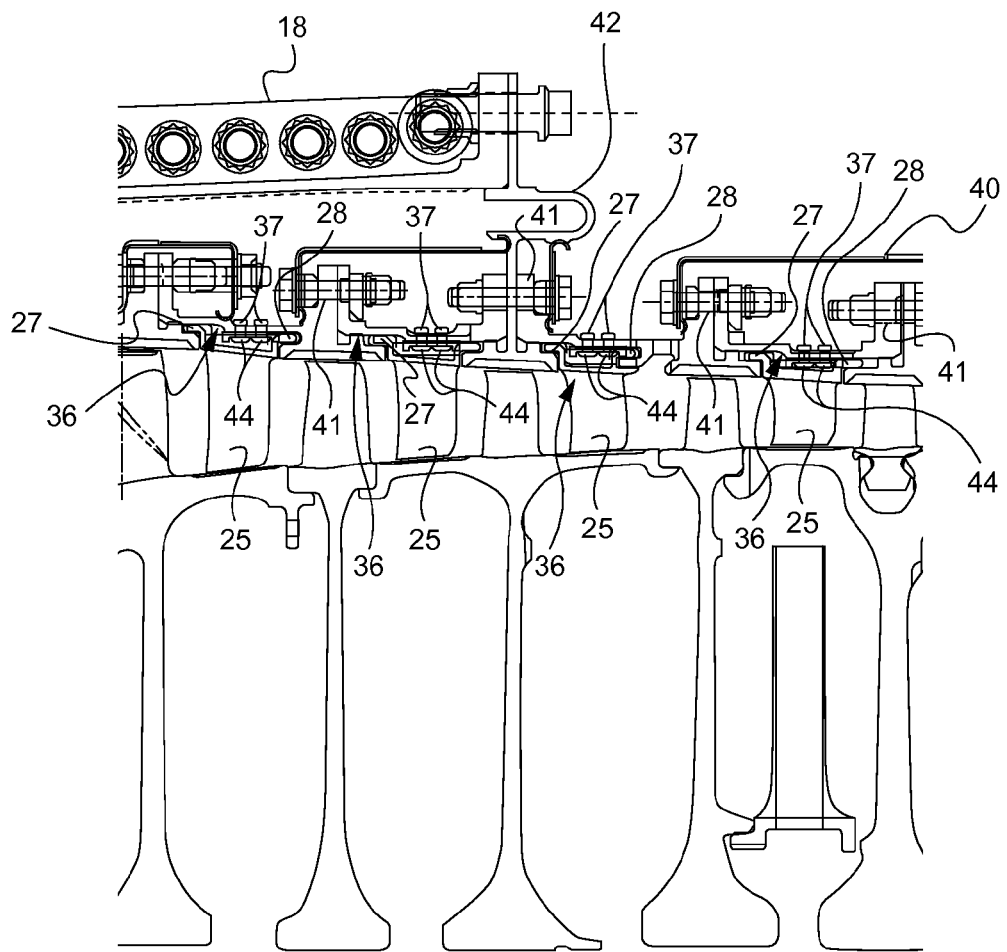
FIG. 2 is a partial sectional view of alternating conventional stators and rotors.

Referring to FIG. 1, an exemplary turbofan gas turbine engine 10 is shown schematically. The gas turbine engine 10 includes a fan 11 disposed within an outer housing or shroud 12, which is only partially shown in FIG. 1. The fan 11 compresses intake air that enters through the housing opening 13 and feeds the compressed air to a low pressure compressor (LPC) 14. The LPC 14 is disposed between the fan 11 and a high pressure compressor (HPC) 15. The HPC 15 is disposed between the LPC 14 and a combustor 16. In the combustor 16, the air, which has been compressed by the LPC 14 and HPC 15, is mixed with fuel and ignited to generate a high energy and high velocity stream of gases that flows through a turbine 17. Energy from the stream of gases passing through the turbine 17 is used to drive the LPC 14 and HPC 15. The LPC 14, HPC 15, combustor 16 and turbine 17 are housed within an inner shroud 18.

The LPC 14, HPC 15 and turbine 17 each include a plurality of rotors, shown generally at 21, that rotate between stationary stators, shown generally at 22. The dynamic loading of each stator 22 caused by the rotors 21 can generate tangential forces or circumferential forces about the central axis 23 of the engine 10 that can approach 500 lb·f (2225 N). Disclosed herein is a convenient means for preventing any circumferential rotation of the stators 22 about the axis 23.

To explain the function of the disclosed locking or anti-rotation stator segments, currently available locking stator segments 25 are shown in FIGS. 3-4 and described with reference to FIG. 2. Referring first to FIGS. 3-4, a segment 25 includes a shroud 30 which, in turn, includes a platform 26, a forward hook 27, an aft hook 28, and a vane 29 that extends below the platform 26. The vane 29 includes a leading edge 31 and a trailing edge 32. The platform 26 is disposed between a pair of cheeks 34, 35 and each platform includes opposing sidewalls 38, 39 disposed inwardly from the cheeks 34, 35. The sidewalls 38, 39 are used to engage a bolt or lug that extends downward from the case to prevent circumferential movement of the segments 25 along the case. However, to create space for accommodating the bolt or lug, the sidewalls 38, 39 must be offset from the cheeks 34, 35 and the aft hook 28 is made narrower than the forward hook 27. The narrower aft hook 28 is positionally less stable and prone to rocking, thereby making precise control of the position of the locking stator segments 25 difficult.

Turning to FIG. 2, the segments 25 form an endless ring or a stator 22 (FIG. 1). The segments 25 are slidably received in a case 36, four of which are shown in FIG. 2. The forward hooks 27 are trapped in rearward facing pockets in the cases 36 and the aft hooks 28 are trapped in similar forward facing pockets of the cases 36. Because the segments 25 are slidably received in the cases 36, a means for preventing circumferential rotation of the stator segments is needed. In the example shown in FIG. 2, bolts or fasteners 37 are used for this purpose. The bolts or fasteners 37 extend through the case 36 so that segments 25 disposed on either side of the bolt or fastener 37 is secured circumferentially within the case 36 to prevent circumferential sliding of the segments 25 around the case 36 and about the axis 23.

Of course, force imposed on the segments 25 is also translated to the cases 36. The cases 36 are secured to the engine shroud 18 by one or more brackets 40 which are secured to the cases 36 by bolts or fasteners 41. The brackets 40 are then secured to the engine shroud 18 by supports, such as the one shown at 42 in FIG. 2.

In addition to the narrowed aft hooks 28, other disadvantages with the system shown in FIG. 2 include the need to pass the bolts 37 through the case 36 so that the heads 44 of the bolts 37 engage the platforms 26 of the segments 25 to prevent circumferential rotation of the segments 25 about the axis 23 of the engine 10. The fasteners require additional assembly time and can weaken the case 36. Further, each locking portion requires at least one bolt 37 and two locking stator segments 25.

Figure 6:
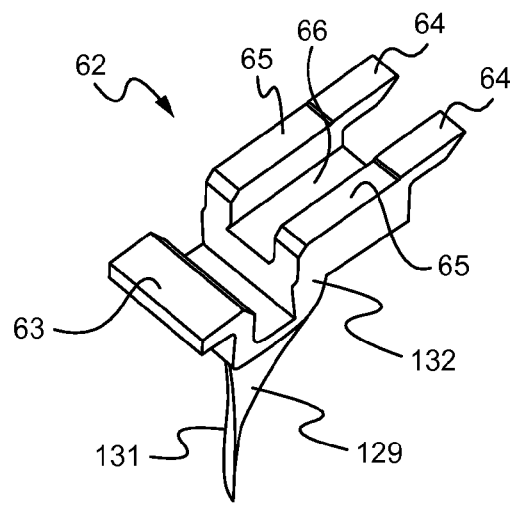
FIG. 6 is a perspective view of the locking stator segment shown in FIG. 5.
Figure 5:
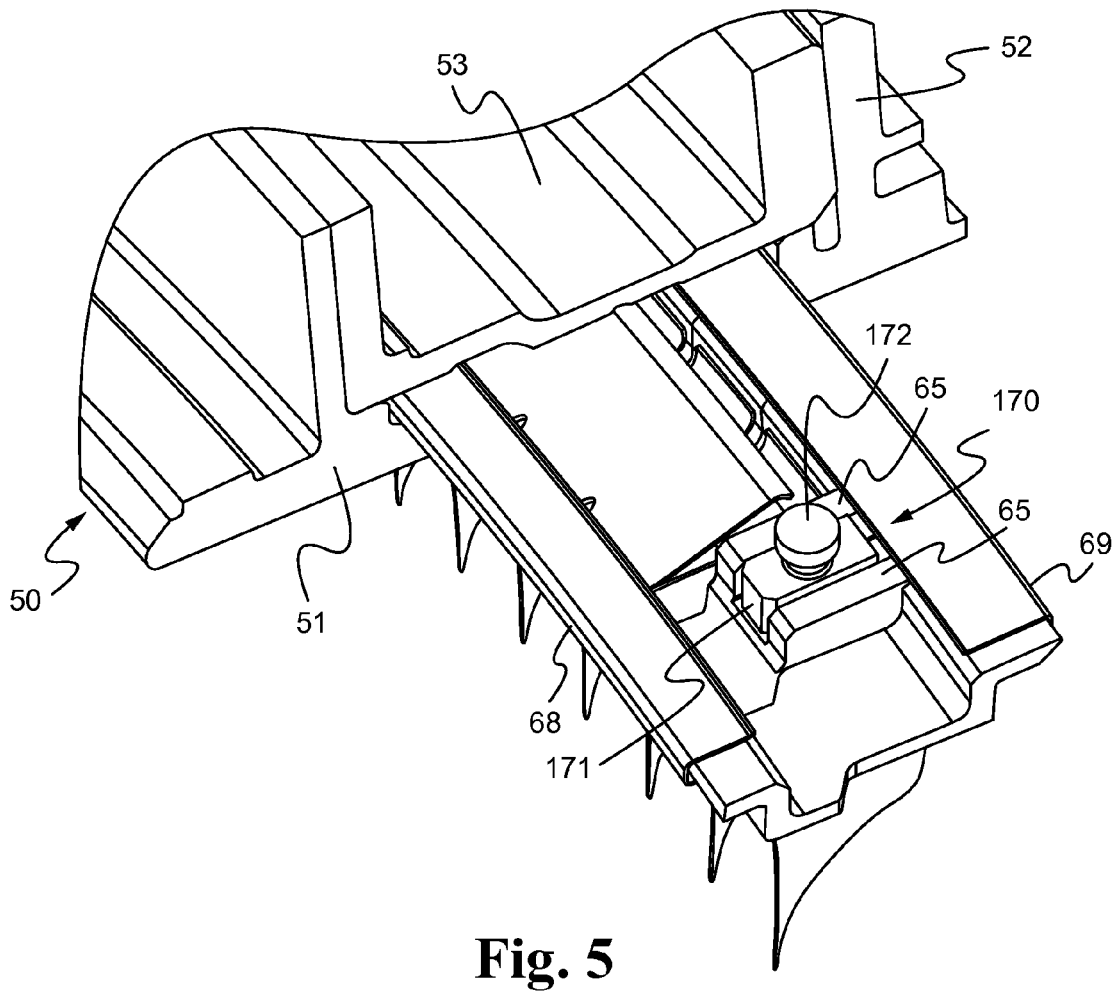
FIG. 5 is a partial perspective view of a disclosed case, locking stator segment and lug that secures the locking stator segment to the case and prevents circumferential movement of the locking stator segment and other stator segments along the case.

An improved solution with better position control is provided by the anti-rotation system illustrated in FIGS. 5-9. Turning to FIG. 5, a case 50 includes a forward portion 51, an aft portion 52 and a central portion 53 disposed therebetween. A damper spring 54 may be disposed below the central portion 53 for exerting a radially inward bias on the shrouds of the non-locking stator segments. Referring to FIG. 9, the central portion 53 of the case 50 is sandwiched between the forward portion 51 and the aft portion 52, only parts of which are shown in FIG. 9. The forward portion 51 of the case 50 includes a rearwardly directed rail 56. The rearwardly directed rail 56, in combination with the central portion 53 forms a forward pocket 57. An aft pocket 58 is also formed by the central portion 53 of the case 50 and a forwardly extending rail 61 of the aft portion 52 of the case 50. The locking segments 62 shown in FIGS. 8-9 and FIG. 6, each include a forward hook 63 and a pair of aft hooks shown at 64. The aft hooks 64 are extensions of the outwardly protruding members 65 of the shroud 60 which define a slot 66 as shown in FIG. 6. FIG. 6 also shows a vane 129 having a leading edge 131 and a trailing edge 132, similar to those shown in FIGS. 3-4.

Comparing FIGS. 6 and 9, the aft hooks 64 are received in the aft pocket 58 while the forward hook 63 is received in the forward pocket 57. To help secure the hooks 63, 64 in the forward and aft pockets 57, 58 respectively and to reduce wear on the case 50, forward and aft liners 68, 69 are employed to assist in frictionally securing the forward and aft hooks 63, 64 and the forward and aft pockets 57, 58 respectively.

Figure 7:
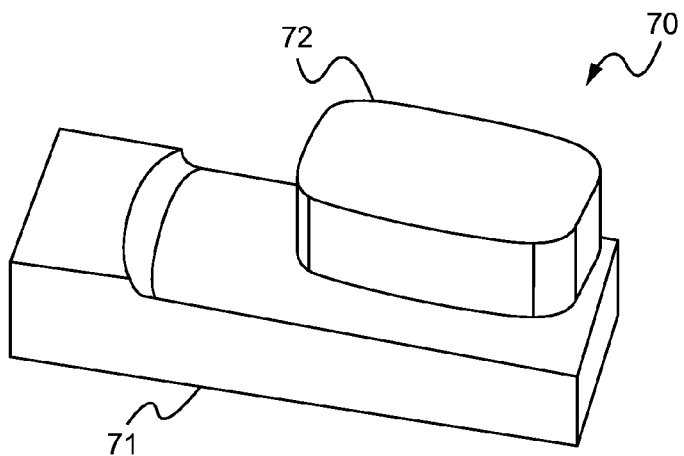
FIG. 7 is a perspective view of a lug that can be used with the locking stator segment shown in FIGS. 5 and 6.

Returning to FIG. 6, the slot 66 of the locking segment 62 may receive a lug 70 as shown in FIG. 7. The lug 70 includes an inner block 71 that is received in the slot 66 and an outwardly protruding stud 72. An alternative lug 170 is shown in FIG. 5 with an inner block 171 and outwardly protruding stud 172.

As shown in FIGS. 8-9, the studs 72 extend upward from the inner blocks 71 and are received in a gap, slot or recess 73 in the central portion 53 of the case 50. Essentially, the locking segments 62 may be disposed between two stator segments and the central portions 53 of the cases 50 may include a gap, slot or recess 73 through which the protruding studs 72 extend. Thus, circumferential rotation of the stator segments and the locking segments 62 is precluded by the outwardly protruding studs 72 engaging the central portions 53 of the cases 50 and the slots 66 of the locking stator segments 62. As shown in FIG. 8, the central portions 53 of the cases 50 remain in a fixed position with respect to the shroud 18 (see FIGS.

1-2) as the central portions 53 are secured to the support 142, which is secured to the engine shroud 18 or to one of the brackets 140.

Thus, an anti-rotation stator segment system is disclosed whereby the stator segments are held in place by locking segments 62 that are prevented from circumferential movement about the cases 50 by engagement of the outwardly protruding studs 72 of the lugs 70 engaging the central portion 53 of the case 50 and the slot 66 of a locking stator segment 62, which may be disposed between two conventional stator segments.

INDUSTRIAL APPLICABILITY

The anti-rotation slot 66 of the locking stator segments 62 and mating lug 70 are disposed in the circumferential center of the locking stator segment shroud 60 (FIG. 6) and not at the outer edges of two segments 25 as shown in FIGS. 3 and 4. The disclosed locking stator segments 62 provide better location control of the segments 62 in the case 50 because the hooks 63, 64 of the segments 62 that engage the case 50 have not been cut away for anti-rotation features. The dual hooks 64 provide improved vane-rotor running clearances and vane section positioning, and therefore better performance and operability.

Thus, a gas turbine engine 10 is disclosed which includes a stator assembly 80 that is fixedly coupled to an engine shroud 18 by one or more supports 142 and/or brackets 140. The stator assembly 80 includes a case 50 that includes a forward portion 51, an aft portion 52 with a central portion 53 disposed therebetween. The case 50 extends about the axis 23 of the engine 10. The forward portion 51 of the case 50 includes a rearwardly extending rail 56. The aft portion 52 of the case 50 also includes a forwardly extending rail 61. The rearwardly extending rail 56 and the forwardly extending rail 61, with the central portion 53 of the case 50, form forward and aft pockets 57, 58 respectively. Forward and aft hooks 63, 64 of the locking segment 62 are received in the pockets 57, 58 respectfully and may be received by liners 68, 69 that line the pockets 57, 58 respectively and limit frictional wear to the case 50. The shrouds 60 of the locking segments 62 may include a pair of upwardly protruding members 65 that define a slot 66 that receives a lug 70. The lug 70 includes an outwardly protruding member 72 that blocks any sliding circumferential movement of the locking segment 62 and/or the other stator segments with respect to the case 50. Because the case 50 is secured to the engine shroud 18; no significant circumferential movement of the stator segments about the axis 23 of the engine 10 is possible.

What is claimed is:

1. A stator assembly coupled to an engine shroud of a gas turbine engine, the stator assembly for preventing circumferential movement of stator segments, the stator assembly comprising:
    an endless case fixedly coupled to the engine shroud, the case including a forward portion, an aft portion and a central portion disposed therebetween, the case extending around an axis,
    the forward and aft portions of the case extending towards each other and forming forward and aft pockets with the central portion respectively,
    a locking stator segment, the locking stator segment including a shroud connected to a vane, the shroud of the locking stator segment including a forward hook and a pair of aft hooks, the forward and aft hooks being retained in the forward and aft pockets respectively,
    the shroud of the locking stator segment including a slot that extends between the aft hooks and accommodates a lug, the lug including an inner block that is received in the slot, the lug further including an outwardly protruding stud being fixedly coupled to the central portion of the case.

2. The stator assembly of claim 1 wherein the slot is at least substantially parallel to the axis of the case.

3. The stator assembly of claim 1 wherein the forward and aft pockets accommodate forward and aft liners respectively, the forward and aft liners frictionally accommodating the forward and aft hooks respectively.

4. The stator assembly of claim 2 wherein the lug includes an inner block that is received in the slot, the lug further including an outwardly protruding stud that is received within a slot disposed in the central portion of the case.

5. The stator assembly of claim 2 wherein the lug includes an inner block that is received in the slot, the lug further including an outwardly protruding stud that is integrally connected to the central portion of the case.

6. The stator assembly of claim 1 further comprising from 1 to 8 locking stator segments, each locking stator segment includes a slot that accommodates one of the lugs that is fixedly coupled to the central portion of the case.

7. The stator assembly of claim 2 further comprising from 1 to 8 locking stator segments and lugs, the case including a plurality of recesses, each slot that accommodates one of the lugs that is also received in one of the recesses in the case.

8. A gas turbine engine comprising:
    a stator assembly fixedly coupled to an engine shroud for preventing circumferential movement of the stator assembly,
    the stator assembly including a case including a forward portion, an aft portion and a central portion disposed therebetween, the case extending around an axis of the engine,
    the forward portion of the case including a rearwardly directed rail, the aft portion of the case including a forwardly directed rail, the rearwardly directed rail of the forward portion and the forwardly directed rail of the aft portion extending towards each other beneath the central portion of the case and forming forward and aft pockets respectively, the forward and aft pockets accommodating forward and aft liners respectively,
    a locking stator segment including a shroud connected to a vane, the shroud of the locking stator segment including a forward hook and a pair of aft hooks, the forward and aft hooks being retained in the forward and aft liners respectively,
    the shroud of the locking stator segment also including a slot for accommodating a lug, the lug including an inner block that is received in the slot, the lug further including an outwardly protruding stud being connected to the central portion of the case.

9. The engine of claim 8 wherein the slot in the shroud of the locking stator segment is at least substantially parallel to the axis of the engine, the lug being received in the slot.

10. The engine of claim 9 wherein the lug includes an inner block that is received in the slot, the lug further including an outwardly protruding stud that is received within a recess disposed in the central portion of the case.

11. The engine of claim 9 wherein the lug includes an inner block that is received in the slot, the lug further including an outwardly protruding stud that is integrally connected to the central portion of the case.

12. A method for preventing a circumferential movement of stator segments of a stator assembly of a gas turbine engine, the method comprising:
provinding the stator assembly with an endless case,
fixedly coupling the endless case to a shroud of the engine, the case including a forward portion, an aft portion and a central portion disposed therebetween, the case extending around an axis of the engine,
providing the forward portion of the case with a rearwardly extending case rail and the aft portion of the case with a forwardly extending case rail, the forward and aft case rails and the central portion of the case forming forward and aft pockets respectively,
providing a locking stator segment, the locking stator segment including a shroud that includes a forward hook and a pair of aft hooks, the forward and aft hooks being retained in the forward and aft pockets of the case respectively,
providing the shroud of the locking stator segment with a slot that extends between the aft hooks,
inserting a lug in the slot, the lug including an inner block that is received in the slot and an outwardly protruding stud, and
fixedly coupling the stud to the central portion of the case.

13. The method of claim 12 further including inserting forward and aft liners in the forward and aft pockets respectively, the forward and aft liners frictionally accommodating the forward and aft hooks respectively.

14. The method of claim 12 further including providing a recess in the central portion of the case, providing the lug with an inner block that is received in the slot in the shroud of the locking stator segment, providing the lug with an outwardly protruding stud, and inserting the stud in the recess disposed in the central portion of the case.

15. The method of claim 12 further including providing from 1 to 8 locking stator segments and lugs, coupling each lug to the central portion of the case and to the slot of one of the locking stator segments.

* * * * *